United States Patent
Ostwal et al.

(10) Patent No.: US 12,547,402 B2
(45) Date of Patent: Feb. 10, 2026

(54) METHOD AND ELECTRONIC DEVICE FOR DISTRIBUTING PACKET FLOW

(71) Applicant: Samsung Electronics Co., Ltd., Suwon-si (KR)

(72) Inventors: Nayan Ostwal, Bangalore (IN); Eunchul Jang, Suwon-si (KR); Srihari Das Sunkada Gopinath, Bangalore (IN); Kusung Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 18/504,651

(22) Filed: Nov. 8, 2023

(65) Prior Publication Data
US 2024/0069916 A1    Feb. 29, 2024

Related U.S. Application Data

(63) Continuation of application No. PCT/KR2022/007441, filed on May 25, 2022.

(30) Foreign Application Priority Data

Jun. 15, 2021  (IN) ............................ 20214102660
Mar. 29, 2022  (IN) ............................ 202141026660

(51) Int. Cl.
*G06F 9/30* (2018.01)
*G06F 9/50* (2006.01)
*G06F 9/52* (2006.01)

(52) U.S. Cl.
CPC ............ *G06F 9/3005* (2013.01); *G06F 9/505* (2013.01); *G06F 9/526* (2013.01)

(58) Field of Classification Search
CPC ......... G06F 9/3005; G06F 9/505; G06F 9/526
See application file for complete search history.

(56) References Cited

U.S. PATENT DOCUMENTS

| | | | |
|---|---|---|---|
| 6,480,918 B1 | 11/2002 | Mckenney et al. | |
| 7,395,418 B1 * | 7/2008 | Caprioli | G06F 9/3885 |
| | | | 712/228 |
| 8,738,860 B1 | 5/2014 | Griffin et al. | |

(Continued)

FOREIGN PATENT DOCUMENTS

EP    2987306 B1    2/2019

OTHER PUBLICATIONS

International Search Report for PCT/KR2022/007441 mailed Aug. 25, 2022, 3 pages.

(Continued)

*Primary Examiner* — Corey S Faherty
(74) *Attorney, Agent, or Firm* — Nixon & Vanderhye, P.C.

(57) ABSTRACT

An example method for distributing packet flow by an electronic device including a plurality of processor cores may include receiving a plurality of packet flows for validation; validating the plurality of packet flows by a processor core(s) of the plurality of processor cores based on a validation parameter(s); sequentially distributing the plurality of validated packet flows among the plurality of processor cores for processing based on a combination of a try-lock and a ticket-lock or a core parameter; and transmitting the plurality of distributed packet flows to an electronic entity by the processor core of the plurality of processor cores.

16 Claims, 6 Drawing Sheets

(56) References Cited

U.S. PATENT DOCUMENTS

| | | | |
|---|---|---|---|
| 9,479,431 B1 | 10/2016 | Bratt et al. | |
| 2011/0191624 A1 | 8/2011 | Rodgers et al. | |
| 2012/0243550 A1* | 9/2012 | Connor | H04L 49/9063 370/412 |
| 2014/0056307 A1 | 2/2014 | Hutchison et al. | |
| 2014/0351231 A1 | 11/2014 | McKenney | |
| 2015/0052529 A1* | 2/2015 | Benhase | G06F 9/526 718/102 |
| 2019/0155645 A1 | 5/2019 | Browne et al. | |
| 2021/0075730 A1 | 3/2021 | Palermo et al. | |

OTHER PUBLICATIONS

Written Opinion of the ISA for PCT/KR2022/007441 mailed Aug. 25, 2022, 4 pages.
IN Examination Report for IN202141026660 dated Jan. 30, 2023 and English-language translation, 6 pages.
Extended Search Report dated Sep. 6, 2024 in European Patent Application No. 22825174.0.
Yao et al., "iNPG: Accelerating critical section access with in-network packet generation for NoC based many-cores," 2018 IEEE International Symposium on High Performance Computer Architecture, IEEE, Feb. 24, 2018, XP 33341935, 12 pages.
Communication pursuant to Article 94(3) EPC dated Feb. 3, 2025 in European Patent Application No. 22825174.0.
Ouyang, Jiannan et al., "Preemptable Ticket Spinlocks; Improving Consolidated Performance in the Cloud," VEE'13, vol. 48, No. 7, Mar. 16, 2013, pp. 191-200.

* cited by examiner

METHOD AND ELECTRONIC DEVICE FOR DISTRIBUTING PACKET FLOW

CROSS-REFERENCE TO RELATED APPLICATIONS

This application is a continuation of International Application No. PCT/KR2022/007441 designating the United States, filed on May 25, 2022, in the Korean Intellectual Property Receiving Office, and claiming priority to Indian Provisional Patent Application No. 202141026660, filed on Jun. 15, 2021, and to Indian Complete Patent Application No. 202141026660, filed on Mar. 29, 2022, in the Indian Intellectual Property Office, the disclosures of each of which are incorporated by reference herein in their entireties.

BACKGROUND

Field

The disclosure relates to wireless communication and, more specifically, to a method and an electronic device for efficient packet flow distribution for a multi-core processor.

Description of Related Art

In general, $5^{th}$ generation (5G) new radio (NR) radio access technology has already been deployed in several countries to provide end-to-end quality-of-service (QoS) for a diverse range of services, applications, and users. However, future networks (e.g., beyond fifth-generation (B5G) networks) are expected to provide high end-user throughput and ultra-low latency with high reliability to serve a wide range of services, applications, and users with exceedingly different requirements. With a high data rate demand in 5G NR, the individual user throughput requirement has increased along with a cumulative system throughput. For example, a radio access network (RAN) data plane system is designed to serve several end users simultaneously. As a result, a multi-core processor is introduced to meet large processing demands. Packet flow distribution/data flow scheduling for the multi-core processor is a critical performance element as usage of the multi-core processor for performance gains has increased dramatically.

To achieve optimal performance in a multi-core processor, systems of the related art use a data decomposition method in multi-core processing. Data decomposition is useful when data flows are independent of one another and may be affined to a single core, which has an advantage of avoiding costly critical sections and cache synchronization concerns. Furthermore, the data decomposition method uses a traditional static hash-based distribution strategy for packet flow distribution/data flow scheduling in the multi-core processor. Furthermore, the data decomposition method has a disadvantage that a single high throughput packet flow cannot use parallel cores and thus a maximum per flow throughput is limited by a single core capacity.

Figure 1:
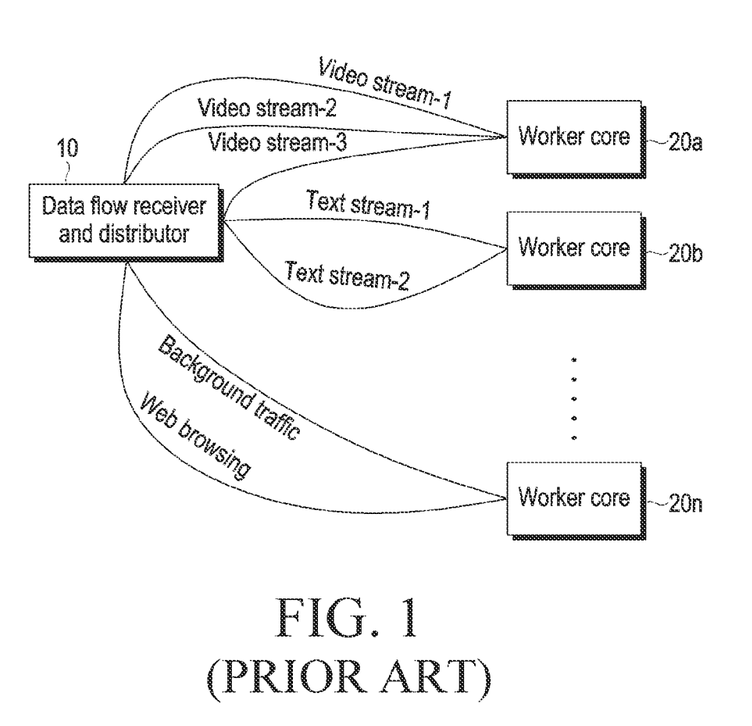
FIG. 1 is an example scenario illustrating a traditional static hash-based distribution strategy for packet flow distribution/data flow scheduling in multi-core processor, according to a prior art.

To achieve optimal performance in the multi-core processor, systems of the related art use a traditional static hash-based distribution strategy for packet flow distribution/data flow scheduling in the multi-core processor, as illustrated in FIG. 1. However, when numerous data flow/packet flows (e.g. video stream-1, video stream-2, and video stream-3) are coupled to a single worker (i.e. worker core 20a) of the multi-core processor, the traditional static hash-based distribution results in unequal load balancing and reduced per-flow throughput. For example, a data flow receiver and distributor (10) sends the numerous data flow/packet flows to a plurality of worker cores (20a to 20n), where the worker core (20a) has more data flows/packet flows to process compared to other worker cores (20b-20n) of the multi-core processor. In other words, unequal load balancing can lead to over utilization of some worker cores (e.g., 20a) and underutilization of some other worker cores (e.g., 20b, 20n).

Furthermore, the throughput of the feedback mechanism (e.g. layer-2 acknowledgement, layer-3 acknowledgement) is proportional to a forward throughput (system throughput). If the feedback throughput also gets processed on the same worker core (e.g. 20a)/or said over utilization/overload of the worker core, performance of system can be degraded. Furthermore, many layer-2 and layer-3 protocols in which multiple users have basic throughput requirements and a large number of users, can result in high total system throughput. However, with an introduction of high data rate requirements in the 5G NR/future networks, per-user throughput need, as well as the cumulative throughput, has increased. According to current multi-core processor utilization statistics, this is usually the bottleneck for increasing the throughput of data flows beyond a capacity of one core of the multi-core processor. So, there is no mechanism in the systems of the related art to provide the higher per-user throughput with an efficient packet flow distribution/data flow scheduling and processing in the multi-core processor among load balancing in each core of the multi-core processor.

Thus, it would be desirable to provide a useful alternative for the efficient packet flow distribution for the multi-core processor.

The above information is presented as background information only to assist with an understanding of the disclosure. No determination has been made, and no assertion is made, as to whether any of the above might be applicable as prior art with regard to the disclosure.

SUMMARY

Various example embodiments of disclosure may sequentially distribute, e.g., by an electronic device, a plurality of validated packet flows among a plurality of processor cores of the electronic device for processing based on a combination of a try-lock and a ticket-lock or a core parameter(s) (e.g. processing capacity, current load, etc.) to derive a maximum throughput with an evenly load balanced system while ensuring that the sequence of the packet flow is not disturbed.

Various example embodiments may provide a method in which a core processor (e.g. core-A) of a plurality of processor cores of an electronic device acquires a try-lock, then releases the try-lock before releasing a ticket-lock of a queue. A core processor (e.g. core-B) of the plurality of processor cores of the electronic device, which fails to acquire the try-lock, first enqueues a packet corresponding to the verified packet flow of the plurality of validated packet flows to the queue and then the core processor (e.g., core-B) checks for the try-lock again. If the try-lock is obtained, the packet is dequeued from the queue and processed.

Various example embodiments can dynamically allocate the core processor based on the core parameter(s) and switch between various packet distribution methods with distribution logic based on the core parameter(s).

Various example embodiments can determine number of active core processors from the plurality of processor cores of the electronic device based on the core parameter(s) and dynamically increase/decrease the number of active core processors based on the core parameter(s).

Additional aspects will be set forth in part in the description which follows and, in part, will be apparent from the description, or may be learned by practice of the example embodiments.

Accordingly, in accordance with an example embodiment of the disclosure, a method for distributing packet flow by an electronic device including a plurality of processor cores may be provided. The method may include receiving, by the electronic device, a plurality of packet flows for validation; validating, by the electronic device, the plurality of packet flows by a processor core(s) of the plurality of processor cores based on a validation parameter(s) (e.g. flow ID validity, flow ID active state check, or any other associated parameters); sequentially distributing, by the electronic device, the plurality of validated packet flows among the plurality of processor cores for processing based on a combination of a try-lock and a ticket-lock or a core parameter; and transmitting, by the electronic device, the plurality of distributed packet flows to an electronic entity by the processor core(s) of the plurality of processor cores.

In an example embodiment, the try-lock is a spinlock that returns lock acquisition failure when the spinlock is not available for the processor core(s) of the plurality of processor cores, rather than waiting continuously for the spinlock to become available In an example embodiment, an electronic device for distributing packet flow may be provided. The electronic device may include a plurality of processor cores, a core controller coupled with a processor, and a memory. The core controller may be configured to receive the plurality of packet flows for validation; validate the plurality of packet flows by the processor core(s) of the plurality of processor cores based on a validation parameter(s); sequentially distribute the plurality of validated packet flows among the plurality of processor cores for processing based on the combination of the try-lock and the ticket-lock or the core parameter(s); and transmit the plurality of distributed packet flows to an electronic entity.

Other aspects, advantages, and salient features of the disclosure will become apparent from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various example embodiments of the disclosure as defined by the claims and their equivalents. It includes various specific details to assist in that understanding, but these are to be regarded as merely examples. Accordingly, various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent that the following description of various example embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The example embodiments of disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments of disclosure. Also, the various embodiments described herein are not necessarily mutually exclusive, as various embodiments can be combined with one or more other embodiments to form new embodiments. The term "or", as used herein, refers to a non-exclusive or, unless otherwise indicated. The examples used herein are intended merely to facilitate an understanding of ways in which the embodiments of disclosure can be practiced and to further enable practice the embodiments of disclosure. Accordingly, the examples should not be construed as limiting the scope of the embodiments of disclosure.

As is traditional in the field, example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments of disclosure are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "worker core", "core" "processor core", and "core processor" are used interchangeably and may have the same meaning. Throughout this disclosure, the terms "plurality of processor cores", and "multi-core processor" are used interchangeably and may have the same meaning.

Accordingly, an example embodiment of disclosure may provide a method for distributing packet flow by an electronic device including a plurality of processor cores. The method may include receiving, by the electronic device, a plurality of packet flows for validation. Further, the method may include validating, by the electronic device, the plurality of packet flows by a processor core(s) of the plurality of processor cores based on a validation parameter(s) (e.g. e.g. flow ID validity, flow ID active state check, or any other associated parameters). Further, the method may include sequentially distributing, by the electronic device, the plurality of validated packet flows among the plurality of processor cores for processing based on a combination of a try-lock and a ticket-lock or a core parameter. Further, the method may include transmitting, by the electronic device, the plurality of distributed packet flows to an electronic entity by the processor core of the plurality of processor cores.

Accordingly, an example embodiment of disclosure may provide an electronic device for distributing packet flow. The electronic device may include a plurality of processor cores, a core controller coupled with a processor, and a memory. The core controller may be configured to receive the plurality of packet flows for validation. Further, the core controller may be configured to validate the plurality of packet flows by the processor core(s) of the plurality of processor cores based on a validation parameter(s). Further, the core controller may be configured to sequentially distribute the plurality of validated packet flows among the plurality of processor cores for processing based on the combination of a try-lock and a ticket-lock or a core parameter(s). Further, the core controller may be configured to transmit the plurality of distributed packet flows to an electronic entity by the processor core(s) of the plurality of processor cores.

A proposed method may allow the electronic device to sequentially distribute the plurality of validated packet flows among the plurality of processor cores of the electronic device for processing based on a combination of a try-lock and a ticket-lock or a core parameter(s) (e.g. processing capacity, current load, etc.). As a result, there may be equitable load balancing among the plurality of processor cores, and the electronic device may have higher throughput.

An example method is provided in which a core processor (e.g. core-A) of the plurality of processor cores of the electronic device acquires a try-lock, then the try-lock before releasing the ticket-lock of the queue is released. A core processor (e.g. core-B) of the plurality of processor cores of the electronic device which fail to acquire the try-lock, first enqueues a packet(s) corresponding to the verified packet flow of the plurality of validated packet flows to the queue then the core processor (e.g. core-B) checks for the try-lock again. If the try-lock is obtained, the packet(s) is dequeued from the queue and processed.

A proposed method may allow the electronic device to dynamically allocate the core processor based on core parameter(s) and switch between various packet distribution methods with distribution logic based on the core parameter(s).

A proposed method may allow the electronic device to determine a number of active core processors from the plurality of processor cores of the electronic device based on the core parameter(s) and dynamically increase/decrease the number of active core processors based on the core parameter(s).

Referring now to the drawings and more particularly to FIGS. 2A, 2B, 3, 4, and 5, where similar reference characters denote corresponding features consistently throughout the figures, example embodiments of disclosure are shown.

Figure 2A:
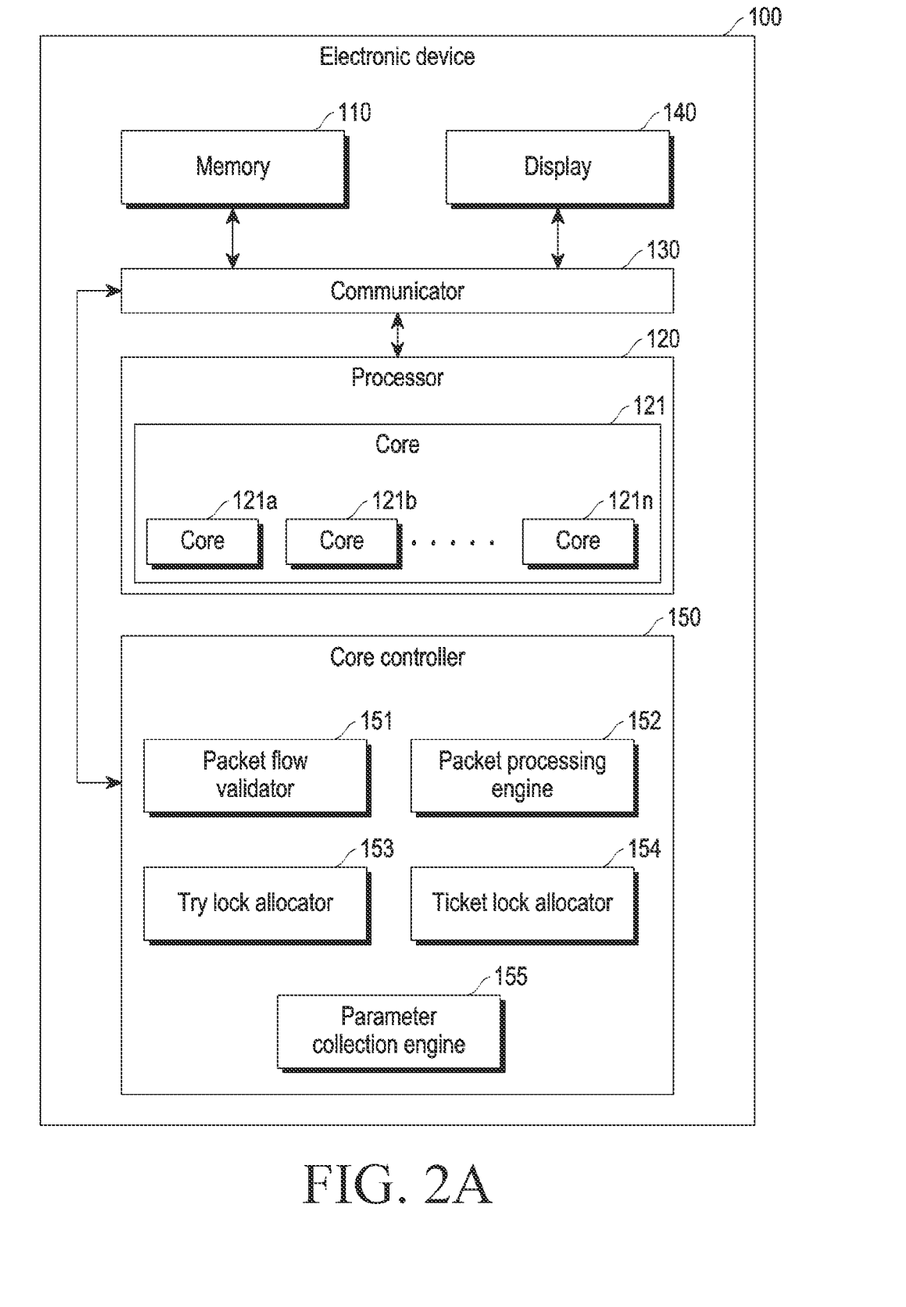
FIG. 2A illustrates a block diagram of an example electronic device for sequentially distributing a plurality of validated packet flows among a plurality of processor cores, according to various embodiments.

FIG. 2A illustrates a block diagram of an electronic device (100) for sequentially distributing a plurality of validated packet flows among a plurality of processor cores (121, e.g., 121a, 121, . . . 121n), according to various embodiments of the disclosure. Examples of the electronic device (100) include, but are not limited to, a smartphone, a tablet computer, a personal digital assistance (PDA), an internet of things (IoT) device, a wearable device, a network entity (e.g. E-UTRAN Node B (eNB), gNB, etc.), a server, etc.

Referring to FIG. 2A, the electronic device (100) includes a memory (110), a processor (120), a communicator (130) (including, e.g., a communication circuit), a display (140), and a core controller (150) (including, e.g., a core controller circuit).

In an embodiment, the memory (110) stores a plurality of packet flows, a plurality of validated packet flows, a plurality of distributed packet flows, a try-lock, a ticket-lock, a validation parameter(s), a core parameter(s), core related information (e.g. active core, deactivate core, etc.), a threshold value (or a threshold range), and a packet(s). The memory (110) stores instructions to be executed by the processor (120). The memory (110) may include non-volatile storage elements. Examples of such non-volatile storage elements may include, but are not limited to, magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In various examples, the memory (110) can be configured to store larger amounts of information than the memory. In certain examples, a non-transitory storage medium may store data that can, over time, change (e.g., in random access memory (RAM) or cache). The memory (110) can be an internal storage unit or it can be an external storage unit of the electronic device (100), cloud storage, or any other type of external storage.

The processor (120) includes a plurality core processors (121a-121n). The processor (120) communicates with the memory (110), the communicator (130), the display (140), and the core controller (150). The processor (120) is configured to execute instructions stored in the memory (110) and to perform various processes. The processor (120) may include one or a plurality of processors (121), maybe a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (130) is configured for communicating internally between internal hardware components and with external devices (e.g. eNB, gNB, server, electronic entity, etc.) via one or more networks (e.g. radio technology). The communicator (130) includes an electronic circuit specific to a standard(s) that enables wired or wireless communication.

The core controller (150) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the core controller (150) includes a packet flow validator (151), a packet processing engine (152), a try-lock allocator (153), a ticket-lock allocator (154), and a parameter collection engine (155).

In an embodiment, the packet flow validator (151) receives the plurality of packet flows for validation from a packet flow receiver and distributor (not shown in FIG. 2A) of the electronic device (100). Further, the packet flow validator (151) validates the plurality of packet flows by a processor core(s) of the plurality of processor cores (121) based on the validation parameter(s).

In an embodiment, the packet processing engine (152) sequentially distributes the plurality of validated packet flows among the plurality of processor cores (121) for processing based on a combination of the try-lock and the ticket-lock or the core parameter. The packet processing engine (152) receives information associated with the try-lock and the ticket-lock from the try-lock allocator (153) and the ticket-lock allocator (154). The try-lock is a spinlock that returns lock acquisition failure when the spinlock is not available for the processor core(s) of the plurality of processor cores (121), rather than waiting continuously for the spinlock to become available. The ticket-lock is a spinlock that applies ordering to verify that lock acquisition takes place on a first-come, first-served basis. The try-lock and ticket-lock verify ingress order for each packet flow of the plurality of packet flows, and each packet flow includes the try-lock and ticket-lock for a queue(s).

Furthermore, the packet processing engine (152) determines whether a core processor(s) (e.g. core-A) of the plurality of processor cores (121) receives a first request to process a packet(s) corresponding to a validated packet flow(s) of the plurality of validated packet flows. Furthermore, the packet processing engine (152) determines whether the try-lock is available using the received information associated with the try-lock from the try-lock allocator (153) in response to determining that the processor core(s) of the plurality of processor cores (121) receives the first request to process the packet(s) corresponding to the validated packet flow(s) of the plurality of validated packet flows.

Furthermore, the packet processing engine (152) processes the packet(s) corresponding to the validated packet flow(s) of the plurality of validated packet flows in response to determining that the try-lock is available. Furthermore, the packet processing engine (152) detects that another core processor(s) (e.g. core-B) of the plurality of processor cores (121) receives a second request to process a packet(s) corresponding to a validated packet flow(s) of the plurality of validated packet flows and enqueues the packet(s) corresponding to the validated packet flow(s) of the plurality of validated packet flows in a queue based on the ticket-lock in response to determining that the try-lock is not available and determines whether the try-lock is available in response to enqueueing the packet(s) in the queue.

Furthermore, the packet processing engine (152) obtains the ticket-lock using the received information associated with the ticket-lock from the ticket-lock allocator (154) in response to detecting that the process is completed. Furthermore, the packet processing engine (152) determines whether the queue is empty. Furthermore, the packet processing engine (152) de-queues the packet(s) corresponding to the validated packet flow(s) of the plurality of validated packet flows from the queue in response to determining that the queue is not empty, releasing the ticket-lock corresponding to enqueue ticket-lock, and processes the packet(s) corresponding to the validated packet flow(s) of the plurality of validated packet flows. Furthermore, the packet processing engine (152) releases the try-lock first and then releases the ticket-lock in response to determining that the queue is empty and informs the try-lock allocator (153) and the ticket-lock allocator (154) to update status (e.g. available, not available, etc.).

In an embodiment, the parameter collection engine (155) collects the core parameter(s) from the plurality of processor cores (121). The core parameter(s) includes, for example, a processing capacity of each core of the plurality of processor cores (121), a ratio of sequential section cycles and parallel section cycles of the plurality of processor cores (121), a current load on each core of the plurality of processor cores (121), a load balancing, a ratio of a packet flow distribution, an individual core utilization of the plurality of processor cores (121), a total core utilization of the plurality of processor cores (121), and/or average utilization of the plurality of processor cores (121).

Furthermore, the packet processing engine (152) determines the core parameter(s) associated with each processor core of the plurality of processor cores (121) and dynamically allocates the plurality of validated packet flows among the plurality of processor cores (121) based on the core parameter. Furthermore, the packet processing engine (152) switches between various packet flow distribution methods such as static core-affine methods, multi-core distribution methods, etc. based on the core parameter(s).

Furthermore, the packet processing engine (152) determines a number of active cores of the plurality of processor cores (121) based on the core parameter(s). Furthermore, the packet processing engine (152) determines whether a value of an average core utilization of the active core(s) exceeds the threshold value (e.g. 80% utilization of processor). Furthermore, the packet processing engine (152) increases the number of the active core(s) of the plurality of processor cores (121) in response to determining that the value of an average core utilization of the active core(s) exceeds the threshold value. Furthermore, the packet processing engine (152) decreases the number of the active core(s) of the plurality of processor cores (121) in response to determining that the value of an average core utilization of the active core(s) does not exceed the threshold value.

Furthermore, the packet processing engine (152) transmits the plurality of distributed packet flows to an electronic entity (e.g. another electronic device(s)).

Although the FIG. 2A shows various hardware components of the electronic device (100), it is to be understood that other embodiments are not limited thereon. In various embodiments, the electronic device (100) may include fewer or more components. Further, the labels or names of the components are used only for illustrative purposes and do not limit the scope of the disclosure. One or more components can be combined to perform the same or substantially similar function to distribute the packet flow(s).

Figure 2B:
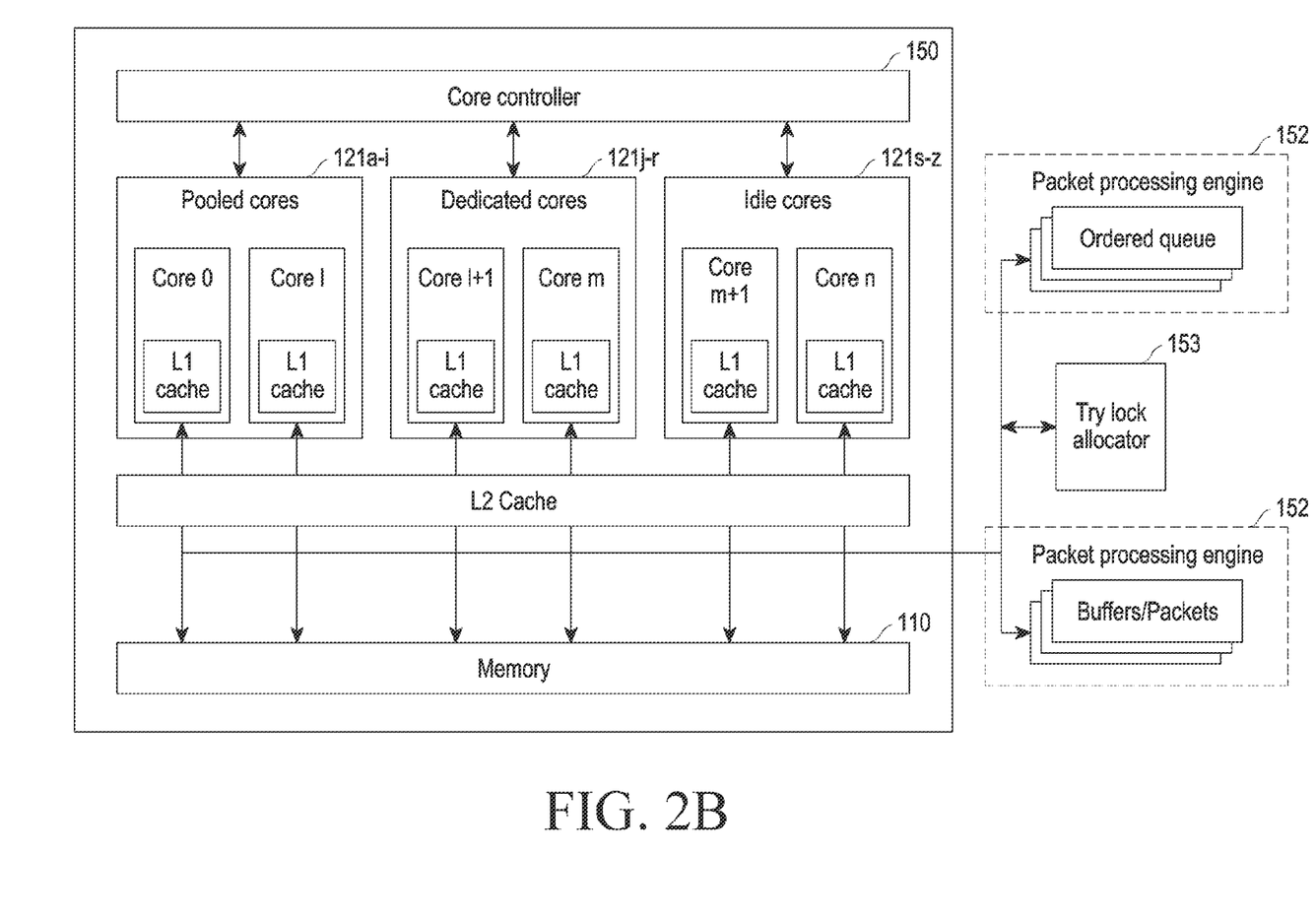
FIG. 2B illustrates a schematic view of an example system for providing efficient packet flow distribution for the multi-core processor, according to various embodiments.

FIG. 2B illustrates a schematic view of an example system for providing efficient packet flow distribution for the multi-core processor, according to various embodiments as disclosed herein.

Referring to FIG. 2B, the system includes the core controller (150), the plurality of core processors (e.g. pooled cores (121a-121i), dedicated cores (121j-121r), idle cores (121s-121z)), the memory (110) (e.g. L1 cache(s) and L2 cache(s)), the try-lock allocator (153), the ticket-lock allocator (154) (not shown in FIG. 2B), and the packet processing engine (152). The packet processing engine (152) orders queues and ensures that the packet(s) are enqueued and dequeued in the same order as arrive from any core (121) using the try-lock allocator (153) and the ticket-lock allocator (154).

In an embodiment, for certain traffic, like guaranteed bit rate (GBR), the core controller (150) provides the dedicated cores (121j-121r) to each traffic flow. The core controller (150) provides the pooled cores (121a-121i) to scale up and down the number of cores (121), based on a total number of active traffic flows and ongoing traffic data rate. The core controller (150) switches between the pooled cores (121a-121i) and the idle cores (121s-121z) to save power consumption of the electronic device (100). Furthermore, the core controller (150) can use a static or AI mechanism to distribute the packet flow(s). A function associated with the AI mechanism may be performed through the non-volatile memory, the volatile memory, and the processor. One or a plurality of processors may control the processing of the input data (e.g., packet(s)/packet flow(s)) in accordance with a predefined operating rule or an AI model stored in the non-volatile memory and/or the volatile memory. The predefined operating rule or artificial intelligence model is provided through training or learning. Here, being provided through learning means that, by applying a learning mechanism to a plurality of learning data, a predefined operating rule or AI model of a desired characteristic is made. The learning may be performed in a device itself in which AI according to an embodiment is performed, and/or may be implemented through a separate server/system. The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks. The learning mechanism is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Figure 3:
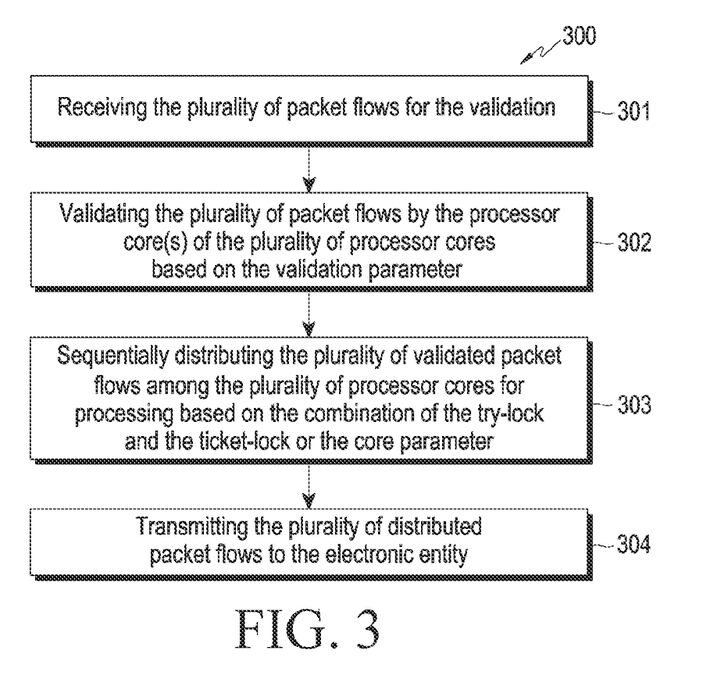
FIG. 3 is a flow diagram illustrating an example method for distributing the plurality of validated packet flows among the plurality of processor cores, according to various embodiments.

FIG. 3 is a flow diagram illustrating an example method 300 for distributing the plurality of validated packet flows among the plurality of processor cores (121), according to various embodiments disclosed herein. The electronic device (100) performs operations (301, 302, 303, and 304) to distribute the packet flow(s) in such a way that the overall throughput of the electronic device (100) increases with load balancing of the plurality of processor cores (121).

Referring to FIG. 3, at operation 301, the method includes receiving the plurality of packet flows for validation. At operation 302, the method includes validating the plurality of packet flows by the processor core(s) of the plurality of processor cores (121) based on the validation parameter(s). At operation 303, the method includes sequentially distributing the plurality of validated packet flows among the plurality of processor cores (121) for processing based on the combination of the try-lock and the ticket-lock or the core parameter. At operation 304, the method includes transmitting the plurality of distributed packet flows to the electronic entity by the processor core of the plurality of processor cores.

The various actions, acts, blocks, operations, or the like in the flow diagram (300) may be performed in the order presented, in a different order, or simultaneously. Further, in various embodiments, some of the actions, acts, blocks, operations, or the like may be omitted, added, modified, skipped, or the like without departing from the scope of the disclosure.

Figure 4:
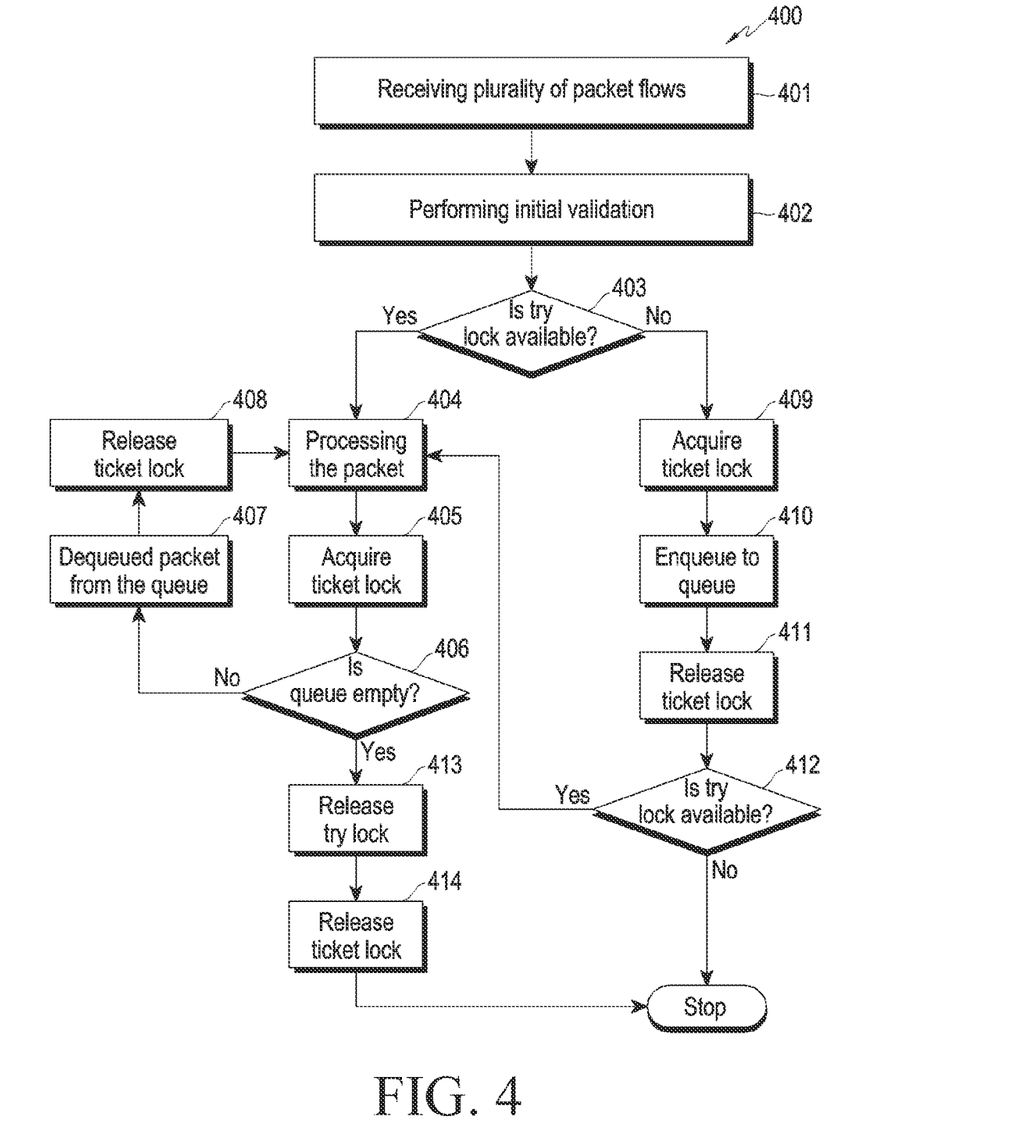
FIG. 4 is a flow diagram illustrating an example method for distributing the plurality of validated packet flows among the plurality of processor cores for processing, according to various embodiments.

FIG. 4 is a flow diagram illustrating an example method 400 for distributing the plurality of validated packet flows among the plurality of processor cores (121) for processing, according to various embodiments disclosed herein. The electronic device (100) performs operations (401 through 414) to distribute the packet flow(s) in such a way that the overall throughput of the electronic device (100) increases with load balancing of the plurality of processor cores (121).

Referring to FIG. 4, an example method of packet flow distribution and processing in the plurality of processor cores (121) communication includes three phases. A first phase is initial validation, a second phase is sequential flow/processing and a third phase is final transmission. The first phase and the third phase can be done in any of the available core(s) of the plurality of processor cores (121). The second phase requires sequential processing, where the electronic device (100) uses the try-lock and the ticket-lock (or a one user-defined queue, which is locked using ticket-lock for each flow). The try-lock is the spinlock, but instead of waiting forever on the availability spinlock, it returns acquisition failure and a user needs to handle a failure. The ticket-lock is a synchronization mechanism that is a type of spinlock that uses "tickets" to control which thread of execution is allowed to enter a critical section and ensures that the tickets are given on a first come first serve basis. All enqueue and dequeued operations on the queue are performed after acquiring ticket-lock.

At operation 401, the method includes receiving the plurality of packet flows for validation. At operation 402, the method includes initially validating the plurality of packet flows by the processor core(s) of the plurality of processor cores (121) based on a validation parameter(s). At operation 403, the method includes receiving, by the core (e.g. core-A), a first request to process the packet(s) corresponding to the validated packet flow(s) of the plurality of validated packet flows and determining whether the try-lock is available in response to determining that the processor core(s) of the plurality of processor cores (121) receives the first request to process the packet(s) corresponding to the validated packet flow(s) of the plurality of validated packet flows.

At operation 404, the method includes processing the packet(s) corresponding to the validated packet flow(s) of the plurality of validated packet flows in response to determining that the try-lock is available. At operation 405, the method includes obtaining the ticket-lock. At operation 406, the method includes determining whether the queue is empty. At operation 407, the method includes de-queuing the packet(s) corresponding to the validated packet flow(s) of the plurality of validated packet flows from the queue in response to determining that the queue is not empty. At operation 408, the method includes releasing the ticket-lock corresponding to queue (e.g., enqueue and dequeues), and processing the packet(s) corresponding to the validated packet flow(s) of the plurality of validated packet flows. The core controller (150) performs operations (404, 405, 406, 407, 408) repeatedly until the queue is empty.

At operation 409, the method includes detecting that another core processor (e.g. core-B) of the plurality of processor cores (121) receives a second request to process the packet(s) corresponding to the validated packet flow(s) of the plurality of validated packet flows, while the core (e.g. core-A) performs the operations (404 to 408). At operation 410, the method includes enqueueing the packet(s) corresponding to the validated packet flow(s) of the plurality of validated packet flows in the queue based on the ticket-lock in response to determining that the try-lock is not available. At operations 411-412, the method includes releasing the ticket-lock and determining whether the try-lock is available in response to enqueueing the packet(s). The core controller (150) performs operations (404, 405, 406, 406, 408) repeatedly until the queue is empty if the try-lock is available after releasing the ticket-lock. At operations 413-414, the method includes releasing the try-lock first and then releasing the ticket-lock in response to determining that the queue is empty.

Consider an example scenario when a worker core (A) trying to enter to the second phase would first try to acquire the try-lock. If the try-lock is available then the worker core (A) will continue processing the packet(s). At the same time, if a worker core (B) tries to access the try-lock, the worker core (B) will fail. Then, instead of waiting, the worker core (B) will enqueue the packet(s) (or said data) to the queue. In a starvation check mechanism, the worker core (B) will make a second attempt to access the try-lock. Upon succeeding to acquire, the try-lock continues to dequeue and process the packets from the queue. The worker core (A) after finishing the processing of the packet(s) would dequeue next packet(s) from the queue and process the packets. The worker core (A) keeps on fetching the packet(s) from the queue until a detection of empty queue. Once the empty queue is detected, the worker core (A) will release the try-lock and then queue lock (i.e. ticket-lock).

Ingress packet(s) order is maintained using the ticket-lock before enqueue to input queue. All enqueues and dequeues are done with the ticket-lock. A method of bulk dequeue can avoid frequent lock and unlock of the ticket-lock. There is a possibility of starvation in the second phase, where worker core (A) checks the queue as empty and then releases the try-lock. At the same time acquisition of the try-lock failed at the worker core (B) and then enqueued the data to queue. As the worker core (A) had already checked the queue as empty, the packet(s) in the queue would never be processed.

To overcome this starvation, there are two modifications in the proposed method. According to a first modification, the worker core (A) which checks the queue is empty, releases the try-lock first and then the ticket-lock of the queue. According to a second modification, when the worker core (B) detects that the try-lock is not available, the worker core (B) would enqueue the packet in the queue using the ticket-lock. After that, the worker core (B) would perform an extra check for the try-lock. This would ensure that by the time the worker core (B) is trying to acquire the try-lock for the second time, the worker core (A) would have either released both the try-lock and the ticket-lock or would not detect the queue as empty.

Figure 5:
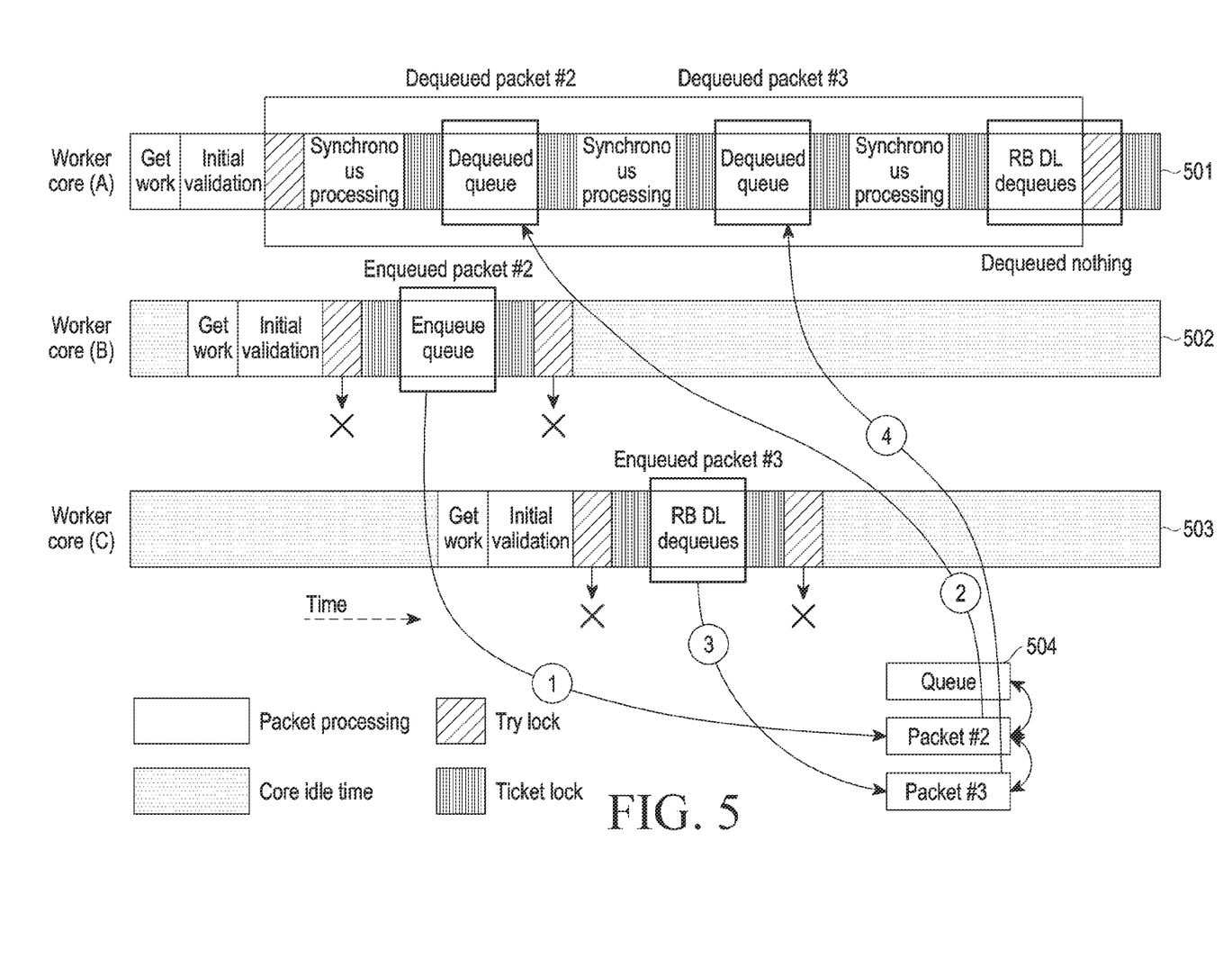
FIG. 5 is an example scenario illustrating packet processing stages for the plurality of processor cores, according to various embodiments.

FIG. 5 is an example scenario illustrating packet processing stages for the plurality of processor cores, according to various embodiments as disclosed herein.

Referring to FIG. 5, an example scenario includes three worker cores (i.e. worker core-A (501), worker core-B (502), and worker core-C (503) of the plurality of the core processors (121)), and all the packets received are for a single flow. The worker core-A (501) first receives a first packet ("get work"), does the initial validation and, after acquiring the try-lock for the flow, the worker core-A (501) starts the sequential processing on the first packet. In parallel, the worker core-B (502) receives a second packet (packet #2). After initial validation of the second packet, the acquisition of try-lock fails and thus worker core-B (502) enqueues the second packet to flow specific queue (504) and then waits for new packets. After finishing the processing of the first packet, the worker core-A (501) dequeues the first packet from flow queue and processes the second packet. In the meantime, the worker core-C (503) also enqueues a third packet (packet #3) to the flow queue due to failure in acquiring flow lock (or said the try-lock). The worker core-A (501) again dequeues the third packet from the queue (504) and processes the third packet. As there are no more packets in the queue (504), the worker core-A (501) releases the try-lock. If a new packet arrives for the same flow, it can be processed on any core as the flow lock would be available.

The example embodiments of disclosure can be implemented using at least one hardware device and performing network management functions to control the elements.

Finally, the language used in the specification has been principally selected for readability and instructional purposes, and it may not have been selected to delineate or circumscribe the inventive subject matter. It is therefore intended that the scope of the disclosure be limited not by this description, but rather by any claims that issue on an application based here on. Accordingly, the disclosure of the embodiments of the disclosure is intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents. It will also be understood that any of the embodiment(s) described herein may be used in conjunction with any other embodiment(s) described herein.

What is claimed is:

1. A method for distributing packet flow by an electronic device comprising a plurality of processor cores, the method comprising:
   receiving, by the electronic device, a plurality of packet flows for validation;
   validating, by the electronic device, the plurality of packet flows by at least one first processor core of the plurality of processor cores based on at least one validation parameter;
   sequentially distributing, by the electronic device, the plurality of validated packet flows among the plurality of processor cores for processing based on a combination of a try-lock and a ticket-lock; and
   transmitting, by the electronic device, the plurality of validated distributed packet flows to at least one electronic entity.

2. The method of claim 1, wherein the plurality of validated distributed packet flows is transmitted to the at least one electronic entity by the at least one first processor core.

3. The method of claim 1, wherein the try-lock comprises a spinlock that returns lock acquisition failure when the spinlock is not available for the at least one first processor core, rather than waiting continuously for the spinlock to become available.

4. The method of claim 1, wherein the ticket-lock comprises a spinlock that applies ordering to verify that lock acquisition takes place on a first-come, first-served basis.

5. The method of claim 1, wherein the try-lock and ticket-lock verify and maintain order for each packet flow of the plurality of packet flows, and each packet flow includes the try-lock and ticket-lock for at least one queue.

6. The method of claim 1, further comprising:
   determining, by the electronic device, whether the at least one first processor core receives a first request to process at least one first packet corresponding to at least one validated packet flow of the plurality of validated packet flows;
   determining, by the electronic device, whether the try-lock is available in response to determining that the at least one first processor core receives the first request to process the at least one first packet; and
   performing, by the electronic device, one of:
      processing the at least one first packet in response to determining that the try-lock is available; or
      detecting that at least one second processor core of the plurality of processor cores receives a second request to process at least one second packet corresponding to at least one validated packet flow of the plurality of validated packet flows and enqueueing the at least one second packet in a queue based on the ticket-lock in response to determining that the try-lock is not available and determining whether the try-lock is available in response to enqueueing the at least one second packet in the queue.

7. The method of claim 6, further comprising:
   obtaining, by the electronic device, the ticket-lock;
   determining, by the electronic device, whether the queue is empty; and
   performing, by the electronic device, one of:
      de-queuing the at least one first packet from the queue in response to determining that the queue is not empty, releasing the ticket-lock corresponding to queue, and processing the at least one first packet; or
      releasing the try-lock first and then releasing the ticket-lock in response to determining that the queue is empty.

8. The method of claim 1, further comprising:
   determining, by the electronic device, a number of active cores of the plurality of processor cores;
   determining, by the electronic device, whether a value of an average core utilization of the active cores exceeds at least one of a threshold value and a threshold range; and
   performing, by the electronic device, one of:
      increasing the number of active cores of the plurality of processor cores in response to determining that the value of an average core utilization of the active cores exceeds the at least one of the threshold value and the threshold range, or
      decreasing the number of active cores of the plurality of processor cores in response to determining that the value of an average core utilization of the active cores does not exceed the at least one of the threshold value and the threshold range.

9. An electronic device for distributing packet flow, the electronic device comprising:
   memory;
   at least one processor comprising a plurality of processor cores; and
   a core controller, operably connected to the memory and the processor and comprising core controller circuitry, configured to:
      receive a plurality of packet flows for validation;
      validate the plurality of packet flows by at least one first processor core of the plurality of processor cores based on at least one validation parameter;
      sequentially distribute the plurality of validated packet flows among the plurality of processor cores for processing based on a combination of a try-lock and a ticket-lock; and
      transmit the plurality of validated distributed packet flows to at least one electronic entity.

10. The electronic device of claim 9, wherein the plurality of validated distributed packet flows is distributed to the at least one electronic entity by the at least one first processor core.

11. The electronic device of claim 9, wherein the try-lock comprises a spinlock that returns lock acquisition failure when the spinlock is not available for the at least one first processor core, rather than waiting continuously for the spinlock to become available.

12. The electronic device of claim 9, wherein the ticket-lock comprises a spinlock that applies ordering to verify that lock acquisition takes place on a first-come, first-served basis.

13. The electronic device of claim 9, wherein the try-lock and ticket-lock verify and maintain order for each packet flow of the plurality of packet flows, and each packet flow includes the try-lock and ticket-lock for at least one queue.

14. The electronic device of claim 9, wherein the core controller is configured to sequentially distribute the plurality of validated packet flows among the plurality of processor cores for processing based on the combination of the try-lock and the ticket-lock by:
   determining whether the at least one first processor core receives a first request to process at least one first packet corresponding to at least one validated packet flow of the plurality of validated packet flows;

determining whether the try-lock is available in response to determining that the at least one first processor core receives the first request to process the at least one first packet; and perform one of:
  processing the at least one first packet in response to determining that the try-lock is available; or
  detecting that at least one second processor core of the plurality of processor cores receives a second request to process at least one second packet corresponding to at least one validated packet flow of the plurality of validated packet flows and enqueueing the at least one second packet in a queue based on the ticket-lock in response to determining that the try-lock is not available and determining whether the try-lock is available in response to enqueueing the at least one second packet in the queue.

15. The electronic device of claim 14, wherein the core controller is configured to process the at least one first packet by:
  obtaining the ticket-lock;
  determining whether the queue is empty; and
  performing one of:
    de-queuing the at least one first packet from the queue in response to determining that the queue is not empty, releasing the ticket-lock corresponding to queue, and processing the at least one first packet; or
    releasing the try-lock first and then releasing the ticket-lock in response to determining that the queue is empty.

16. The electronic device of claim 9, wherein the core controller is configured to:
  determine a number of active cores of the plurality of processor cores;
  determine whether a value of an average core utilization of the active cores exceeds at least one of a threshold value and a threshold range; and
  perform one of:
    increasing the number of active cores of the plurality of processor cores in response to determining that the value of an average core utilization of the active cores exceeds the at least one of the threshold value and the threshold range, or
    decreasing the number of active cores of the plurality of processor cores in response to determining that the value of an average core utilization of the active cores does not exceed the at least one of the threshold value and the threshold range.

* * * * *